United States Patent
Arai et al.

(10) Patent No.: US 8,689,628 B2
(45) Date of Patent: Apr. 8, 2014

(54) DUST-PROOF STRUCTURE FOR MEASURING TOOL

(75) Inventors: Rie Arai, Kawasaki (JP); Shuji Hayashida, Kawasaki (JP); Yuji Oura, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 102 days.

(21) Appl. No.: 13/447,702

(22) Filed: Apr. 16, 2012

(65) Prior Publication Data

US 2012/0272729 A1    Nov. 1, 2012

(30) Foreign Application Priority Data

Apr. 27, 2011 (JP) ................................. 2011-099091

(51) Int. Cl.
   *G01D 11/24*   (2006.01)
   *G01L 19/14*   (2006.01)
   *G01P 1/02*    (2006.01)

(52) U.S. Cl.
   USPC ......................................................... 73/431

(58) Field of Classification Search
   USPC ......................................................... 73/431
   See application file for complete search history.

(56) References Cited

U.S. PATENT DOCUMENTS

| | | | | |
|---|---|---|---|---|
| 1,969,499 | A * | 8/1934 | Bradshaw et al. | 324/156 |
| 7,490,516 | B2 * | 2/2009 | Hedtke et al. | 73/431 |
| 2012/0292385 | A1 * | 11/2012 | MacKay et al. | 235/375 |
| 2013/0094125 | A1 * | 4/2013 | Schwartz et al. | 361/679.01 |

FOREIGN PATENT DOCUMENTS

| | | | |
|---|---|---|---|
| JP | 08193848 A | * | 7/1996 |
| JP | A-8-193848 | | 7/1996 |

* cited by examiner

*Primary Examiner* — Lisa Caputo
*Assistant Examiner* — Jamel Williams
(74) *Attorney, Agent, or Firm* — Oliff PLC

(57) ABSTRACT

A dust-proof structure for a measuring tool, includes: a case provided with an opening formed through a surface opposed to a protection plate thereof; a solar panel accommodated in the case through the opening of the case; an intermediate panel pressing an outer circumferential portion of the solar panel against a bottom wall of the case; a display device disposed at an inward portion of the intermediate panel and opposed to the solar panel with a gap; a cover attached to close the opening of the case; a screw used to secure the cover and the intermediate panel to the case; and a temporary-fixing unit disposed between the intermediate panel and the case, the temporary-fixing unit temporarily fixing the intermediate panel to the case while the outer circumferential portion of the solar panel is pressed against the bottom wall of the case.

4 Claims, 10 Drawing Sheets

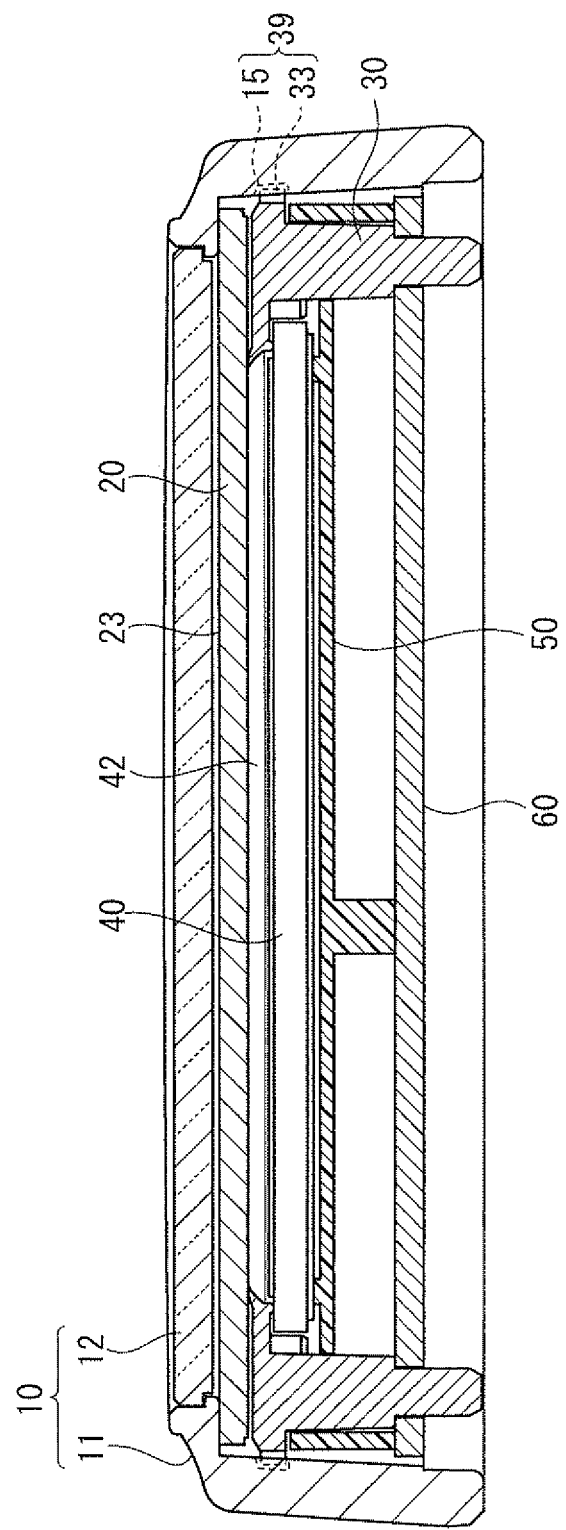

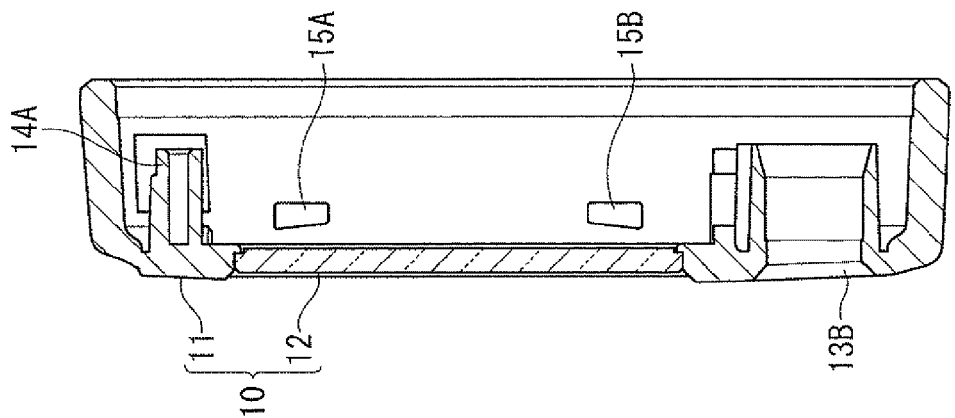
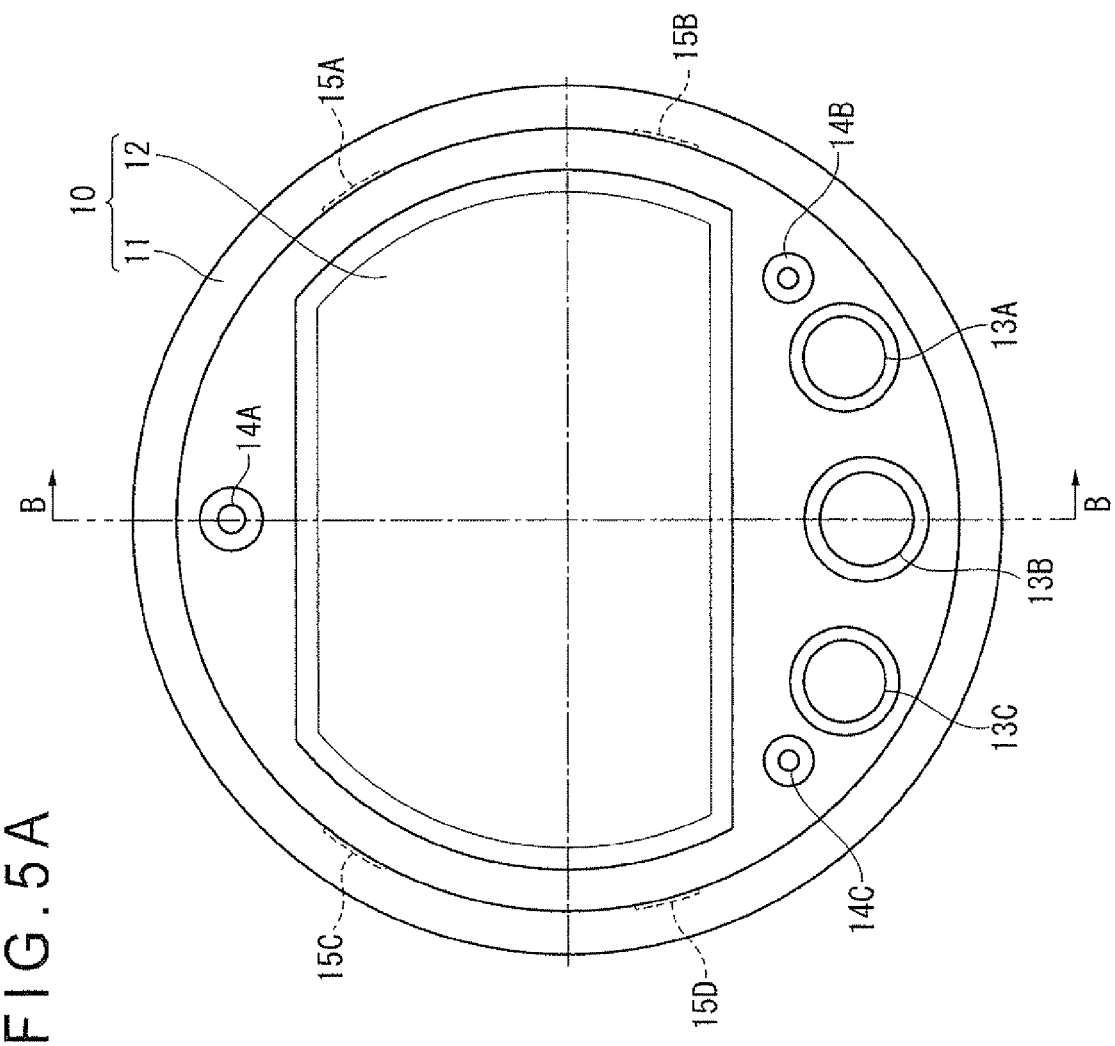

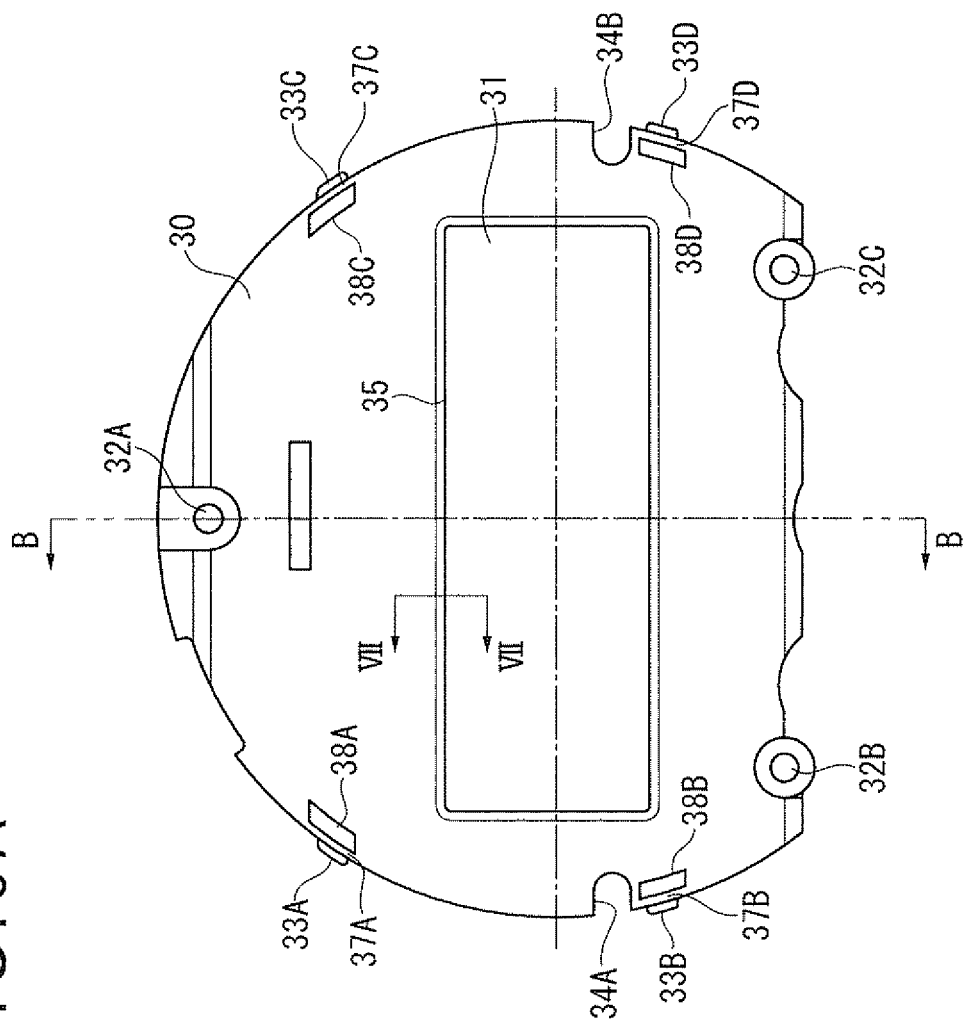

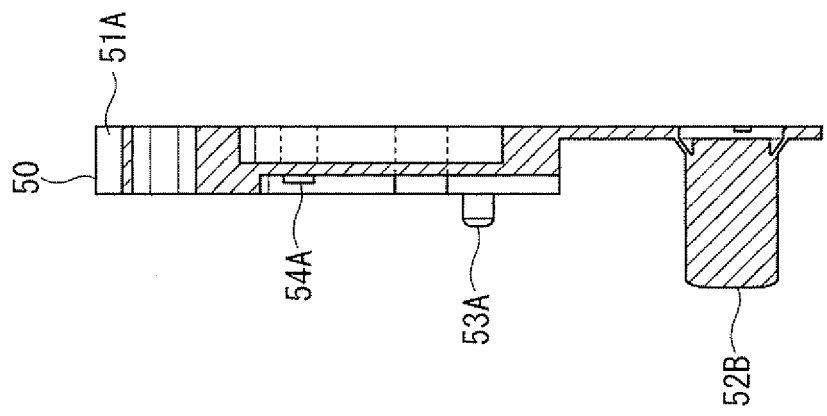
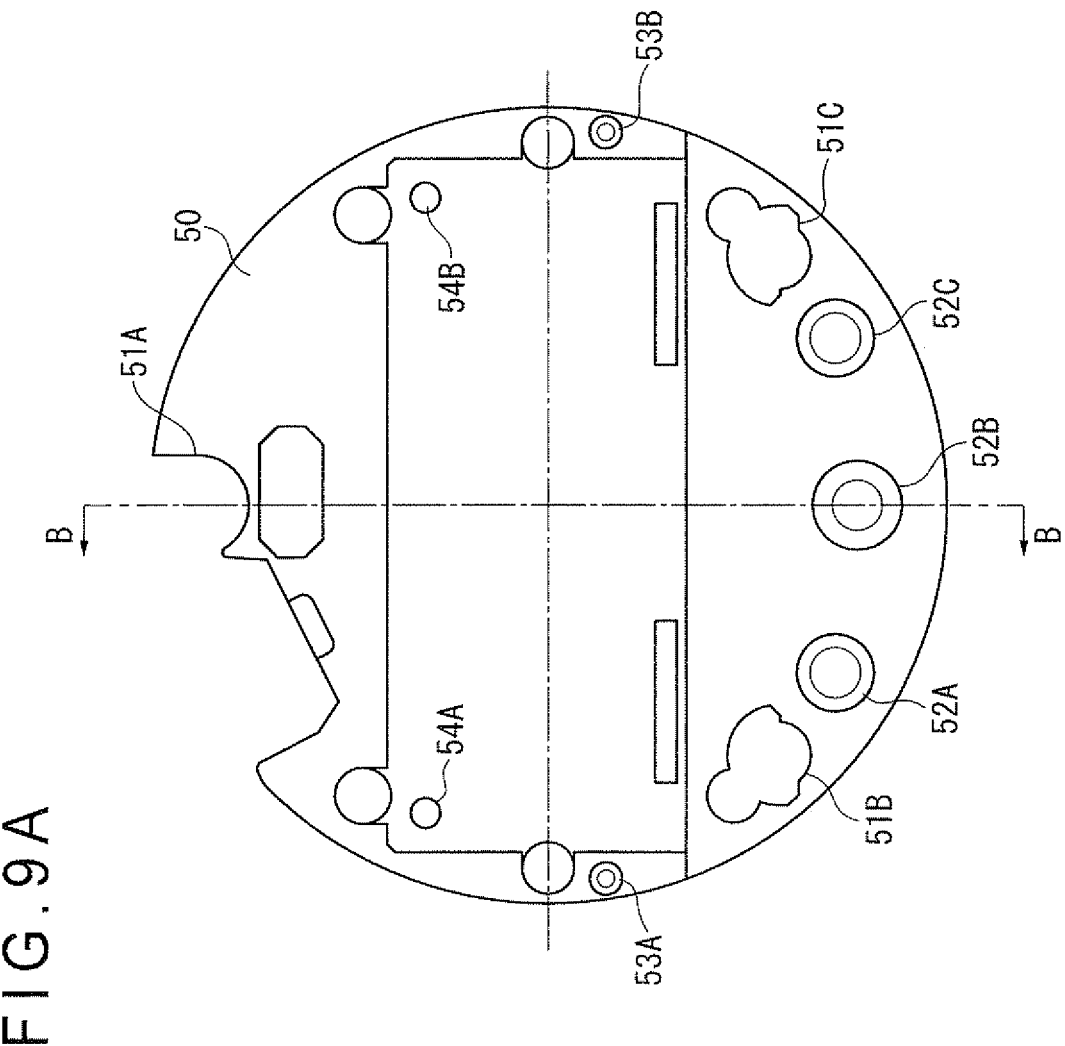

DUST-PROOF STRUCTURE FOR MEASURING TOOL

The entire disclosure of Japanese Patent Applications No. 2011-099091 filed Apr. 27, 2011 is expressly incorporated by reference herein.

BACKGROUND OF THE INVENTION

1. Field of the Invention

The present invention relates to a dust-proof structure for measuring tools. In particular, the present invention relates to a dust-proof structure for electronic components in measuring tools such as an electronic caliper, a micrometer, a dial gauge and a scale unit.

2. Description of Related Art

In measuring tools such as an electronic caliper, a micrometer, a dial gauge and a scale unit, electronic components are accommodated in a dust-proof space so as to prevent malfunction and damage of the electronic components due to dust or the like.

For instance, Patent Literature 1 (JP-A-8-193848) discloses a dust and water proof structure for measuring tools.

As shown in FIG. 10, the dust and water proof structure includes: a case 110 being provided with a transparent protection plate 112 in a bottom wall opposed to an opening 111; a solar cell unit 120 being accommodated in the case 110 through the opening 111 of the case 110 and having an outer circumference surrounded by a first packing 121; an internal frame 130 including a bottom wall 131 pressing the first packing 121 of the solar cell unit 120 against the bottom wall of the case 110, and a flange 132 projecting near an opening end of the case 110; a display device 140 being provided on an inner bottom surface of the internal frame 130; a substrate 150 being attached to the flange 132 of the internal frame 130 via a second packing 151 to close the opening 111; and a screw 170 being tightened to integrally secure the substrate 150 and the flange 132 of the internal frame 130 to the case 110 and loosened to detach the substrate 150 and the flange 132 of the internal frame 130 from the case 110.

With the above dust and water proof structure disclosed in Patent Literature 1, even when dust or the like enters a gap between the protection plate 112 of the case 110 and the solar cell unit 120 and a gap between the internal frame 130 and the display device 140, these components can be detached for cleaning by loosening the screw 170, thereby preventing deterioration in appearance due to such dust or the like.

Based on the assumption that dust enters the structure during assembling or the like, the technique disclosed in Patent Literature 1 is intended to disassemble the structure for cleaning to prevent deterioration in appearance. However, it is nonproductive to disassemble the once-assembled structure and reassemble it.

SUMMARY OF THE INVENTION

An object of the invention is to provide a dust-proof structure for a measuring tool capable of preventing dust or the like from entering during assembling or the like.

According to an aspect of the invention, a dust-proof structure for a measuring tool, includes: a case being provided with an opening formed through a surface opposed to a bottom wall thereof; a first electronic component being accommodated in the case through the opening of the case; an intermediate panel being configured to press an outer circumferential portion of the first electronic component against the bottom wall of the case; a second electronic component being disposed in an inward portion of the intermediate panel and being opposed to the first electronic component with a gap; a cover being attached to the opening of the case to close the opening of the case; a securing unit being configured to secure the cover and the intermediate panel to the case; and a temporary-fixing unit being disposed between the intermediate panel and the case, the temporary-fixing unit being configured to temporarily fix the intermediate panel to the case while the outer circumferential portion of the first electronic component is pressed against the bottom wall of the case.

According to this arrangement, in assembling the measuring tool, when the first electronic component is accommodated in the case through the opening of the case and then the intermediate panel is accommodated in the case, the intermediate panel is temporarily fixed by the temporary-fixing unit while the outer circumferential portion of the first electronic component is pressed against the bottom wall of the case.

Next, the second electronic component is set in the inward portion of the intermediate panel. Even when dust or the like is removed by air blowing before setting the second electronic component, the dust or the like can be prevented from entering a gap between the first electronic component and the bottom wall of the case, thereby preventing malfunction due to the dust or the like.

After the second electronic component is set in the inward portion of the intermediate panel, the cover is attached to close the opening of the case. The cover and the intermediate panel are secured to the case by the securing unit for assembling.

In the above aspect, it is preferable that the temporary-fixing unit includes a recess being formed on an inner circumferential surface of the case, and a projecting portion being formed on an outer circumference of the intermediate panel to be engageable with the recess.

According to the above arrangement, the temporary-fixing unit is provided by the recess being formed on the inner circumferential surface of the case, and the projecting portion being formed on the outer circumference of the intermediate panel to be engageable with the recess. Thus, only by engaging the projecting portion of the intermediate panel with the recess, of the case, the intermediate panel can be reliably temporarily fixed while the outer circumferential portion of the first electronic component is pressed against the bottom wall of the case.

In the above aspect, it is preferable that a hole is formed through the intermediate panel on an inward side relative to the projecting portion such that an elastic beam remains between the projecting portion and the hole.

For engaging the projecting portion of the intermediate panel with the recess of the case, the intermediate panel is eased along the inner circumferential wall of the case. Simultaneously, the projecting portion of the intermediate panel is deformed inwardly due to the elastic deformation of the elastic beam. When reaching the recess of the case, the projecting portion is restored outwardly with elasticity to be engaged with the recess of the case. The projecting portion can thus be easily engaged with the recess of the case.

In the above aspect, it is preferable that the first electronic component is a solar panel, the second electronic component is a display device, and the bottom wall of the case opposed to the solar panel is a transparent protection plate, an elastic body is accommodated between the display device and the cover, and the display device is visible through the protection plate of the case opposed to the solar panel.

With this arrangement, dust or the like can be prevented from entering a gap between the protection plate and the solar panel, thereby preventing deterioration in appearance due to the dust or the like.

In the dust-proof structure of the above aspect, it is preferable that a window is formed in the inward portion of the intermediate panel so that the display device is visible through the solar panel and the protection plate, and a first sealing portion contacting with the solar panel and a second sealing portion contacting with the display device are formed along a circumference of the window.

With this arrangement, since the first sealing portion contacting with the solar panel and the second sealing portion contacting with the display device are formed along the circumference of the window of the intermediate panel, dust or the like can be prevented from entering not only the gap between the protection plate and the solar panel but also a gap between the solar panel and the display device. Thus, deterioration in appearance due to the dust or the like can be further prevented.

BRIEF DESCRIPTION OF THE DRAWINGS

FIG. 4 is a cross sectional view showing the assembled electric module unit according to the exemplary embodiment.

FIG. 5A is a back view showing a case according to the exemplary embodiment.

FIG. 5B is a cross sectional view showing the case according to the exemplary embodiment.

FIG. 6A is a front view showing an intermediate panel according to the exemplary embodiment.

FIG. 6B is a cross sectional view showing the intermediate panel according to the exemplary embodiment.

FIG. 9A is a front view showing a rubber switch member according to the exemplary embodiment.

FIG. 9B is a cross sectional view showing the rubber switch member according to the exemplary embodiment.

DETAILED DESCRIPTION OF PREFERRED EMBODIMENT

Arrangement of Exemplary Embodiment

Figure 1:
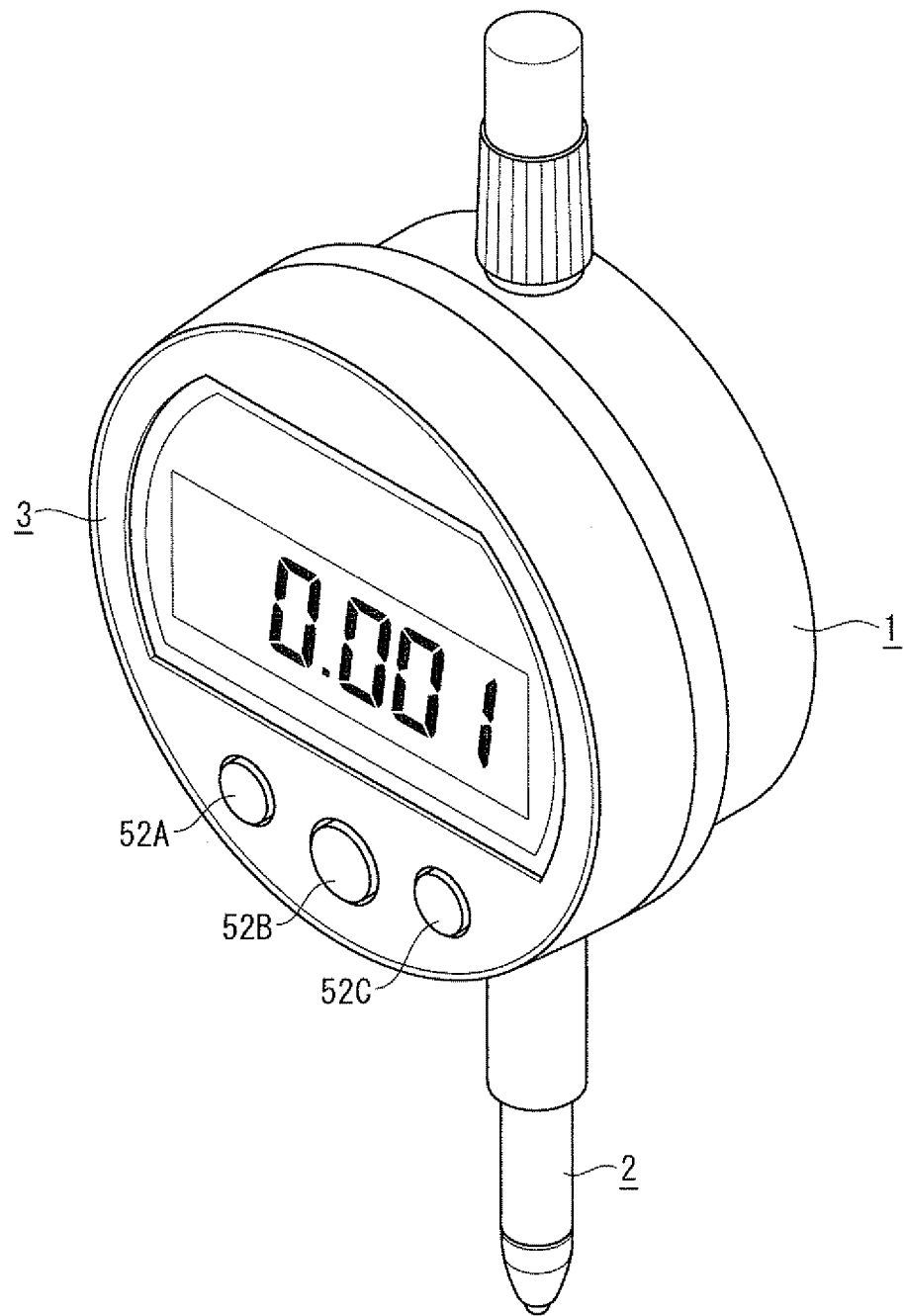
FIG. 1 is a perspective view showing a digital dial gauge according to an exemplary embodiment of the invention.

As shown in FIG. 1, a digital dial gauge according to an exemplary embodiment includes: a cylindrical tool body 1; a spindle 2 that penetrates through the tool body 1 in an axially movable manner; a detector (not shown) that detects the displacement of the spindle 2 in the form of an electric signal; and an electric module unit 3 that is fitted on the front of the tool body 1. The electric module unit 3 processes the electric signal detected by the detector to calculate and digitally display the displacement of the spindle 2. The detector (not shown) may detect based on photoelectricity, electrostatic capacity, magnetism or the like.

Figure 2:
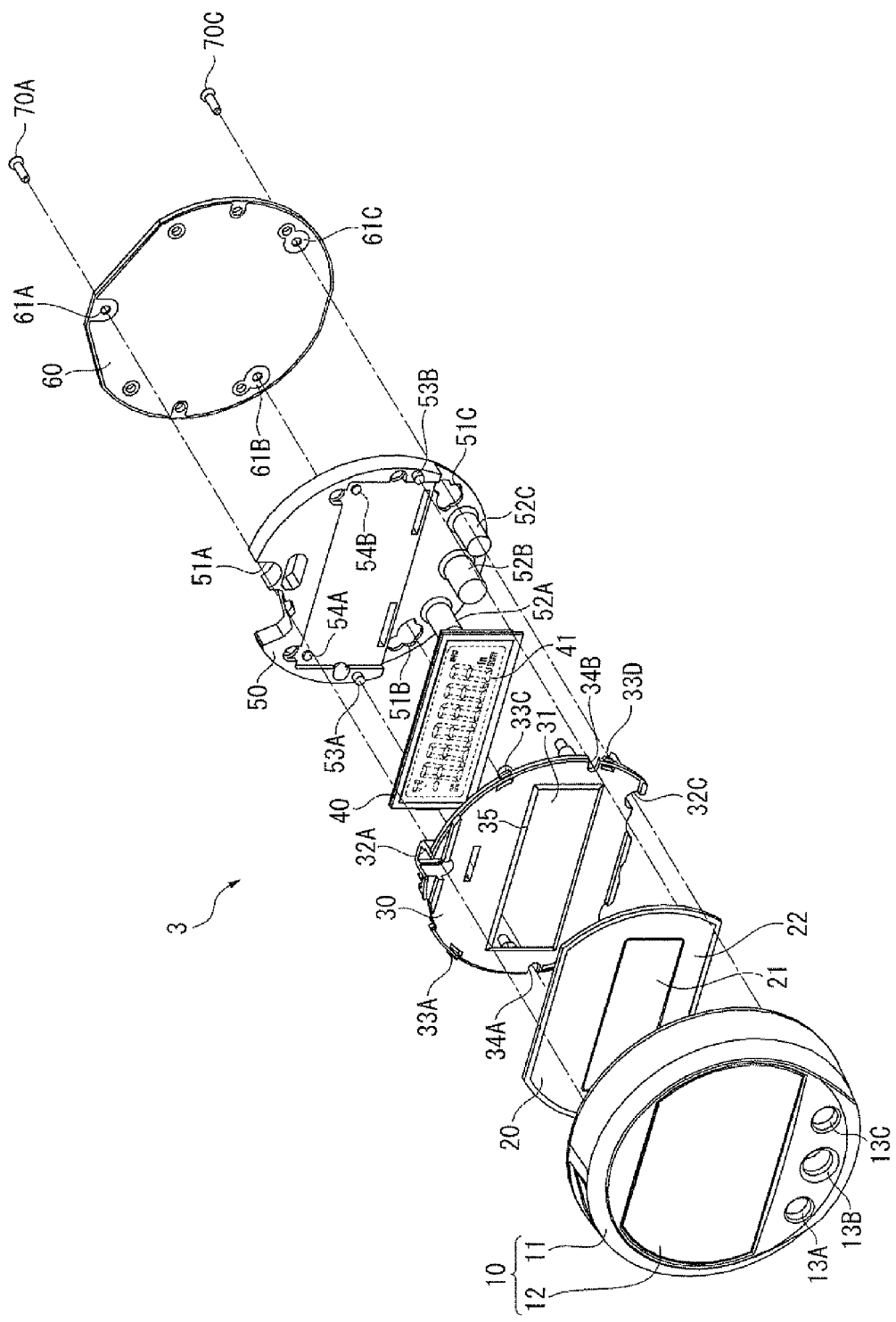
FIG. 2 is an exploded perspective view showing an electric module unit according to the exemplary embodiment.
Figure 3:
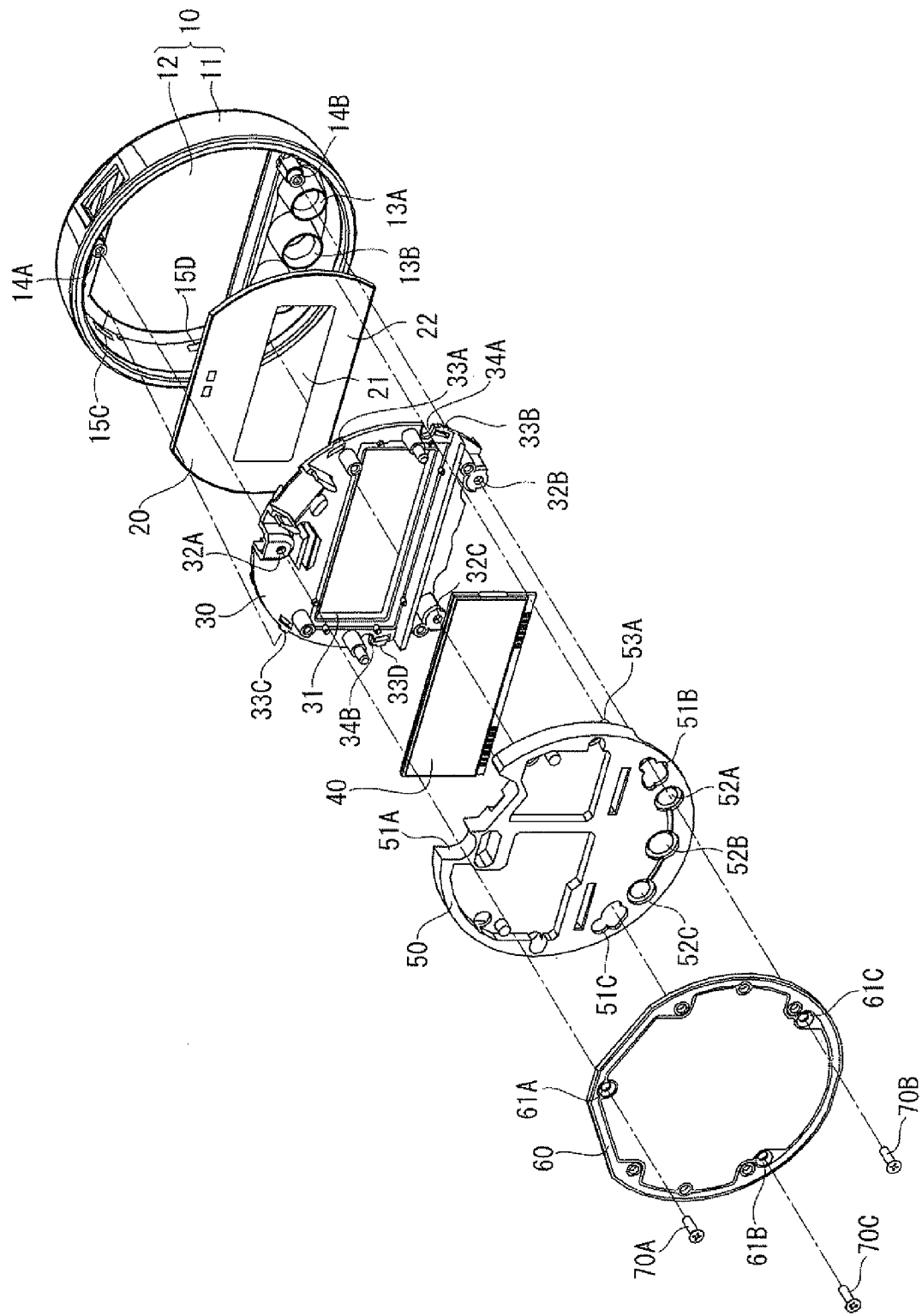
FIG. 3 is an exploded perspective view showing the electric module unit according to the exemplary embodiment from the opposite side of FIG. 2.

As shown in FIGS. 2 to 4, the electric module unit 3 includes a case 10, a solar panel 20 (a first electronic component), an intermediate panel 30, a display device 40 (a second electronic component), a rubber switch member 50 (an elastic body), a substrate 60 (a cover), and three screws 70A, 70B and 70C (a securing member). The solar panel 20, the intermediate panel 30, the display device 40, the rubber switch member 50 and the substrate 60 are sequentially accommodated in the case 10. With the three screws 70A, 70B and 70C, the solar panel 20, the intermediate panel 30, the display device 40, the rubber switch member 50 and the substrate 60 can be secured to and detached from the case 10.

As shown in FIGS. 2, 3, 5A and 5B, the case 10 includes: a case body 11 that is formed from a synthetic resin into a cylindrical frame shape and has an opening dimensioned such that the solar panel, the intermediate panel, the display device, the rubber switch member and the substrate can be accommodated therethrough; and a protection plate 12 that is made of a transparent material and is integrally attached to the bottom wall (the front) of the case body 11 by ultrasonic welding. In place of ultrasonic welding, adhesion or the like may be used to attach the protection plate 12 to the case body 11.

The bottom wall (the front) of the case body 11 is provided with three button-insertion holes 13A, 13B and 13C formed below the protection plate 12 and with three screw-receiving bosses 14A, 14B and 14C formed in the upper and lower portions of the bottom wall across the protection plate 12. Recesses 15A, 15B, 15C and 15D are formed on the inner circumferential wall of the case body 11 at four positions.

The protection plate 12 is in a substantially trapezoidal shape, each lateral side of which is in an arc shape in conformity with the arc of the case 10 and the upper and lower bases of which are straight in parallel with each other. The thickness of the protection plate 12 is slightly thinner than that of the bottom wall of the case body 11. It should be noted that the shape of the protection plate 12 may be different from the substantially trapezoidal shape.

As shown in FIGS. 2 and 3, the shape of the solar panel 20 is conformable to but slightly larger than that of the protection plate 12. The solar panel 20 includes an elongated rectangular transparent plate (or open window) 21 being disposed substantially in the middle thereof and a plurality of solar cells 22 surrounding the transparent plate 21. As shown in FIG. 4, when the solar panel 20 is accommodated in the case 10, the outer circumference of the solar panel 20 is in contact with the bottom wall of the case 10 and a gap 23 is formed between the solar panel 20 and the protection plate 12.

As shown in FIGS. 2, 3, 6A and 6B, the intermediate panel 30 is provided with a window 31 formed in an inward portion thereof so that the display device 40 is visible through the protection plate 12 and the solar panel 20. The intermediate panel 30 is also provided with screw-insertion holes 32A, 32B and 32C formed in the outer circumferential portion thereof at three positions. The screws 70A, 70B and 70C are inserted through the screw-insertion holes 32A, 32B and 32C, respectively. The intermediate panel 30 is also provided with projecting portions 33A, 33B, 33C and 33D formed in the outer circumferential portion thereof at four positions. The projecting portions 33A, 33B, 33C and 33D are engageable with the recesses 15A, 15B, 15C and 15D of the case 10, respectively. The intermediate panel 30 is also provided with U-shaped cuts, namely clearance grooves 34A and 34B, formed in the outer circumferential portion thereof at two positions.

Figure 7:
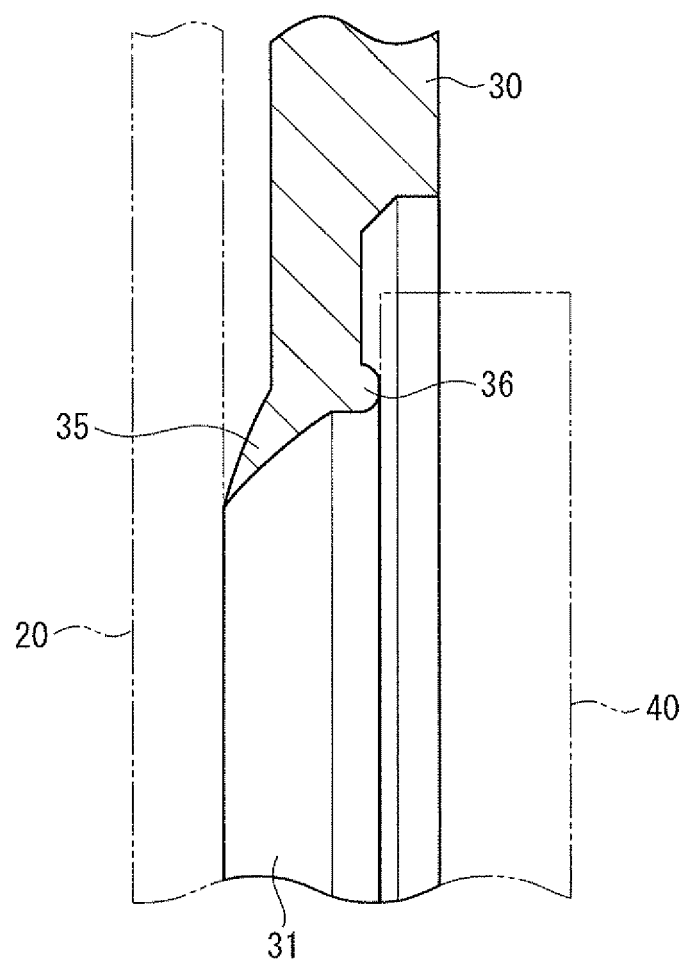
FIG. 7 is a cross sectional view taken along the line VII-VII in FIG. 6A.

As shown in FIG. 7, a first sealing portion 35 being in contact with the solar panel 20 and a second sealing portion 36 being in contact with the display device 40 are formed on the circumference of the window 31. The first sealing portion 35 is formed in a tongue-like shape forwardly projecting toward the center of the window 31 while being gradually thinner. The second sealing portion 36 has a semicircular cross section.

Rhombic holes 38A, 38B, 38C and 38D are formed inwardly adjacent to the projecting portions 33A, 33B, 33C and 33D, respectively, such that elastic beams 37A, 37B, 37C and 37D remain between the holes 38A, 38B, 38C and 38D and the projecting portions 33A, 33B, 33C and 33D, respectively. Thus, the projecting portions 33A, 33B, 33C and 33D are elastically deformable in inward and outward directions of the intermediate panel 30. When the intermediate panel 30 is eased along the inner circumferential wall of the case 10, the projecting portions 33A, 33B, 33C and 33D of the intermediate panel 30 are deformed inwardly due to the elastic deformation of the elastic beams 37A, 37B, 37C and 37D. When reaching the recesses 15A, 15B, 15C and 15D of the case 10, the projecting portions 33A, 33B, 33C and 33D are restored outwardly with elasticity to be engaged with the recesses 15A, 15B, 15C and 15D of the case 10, respectively. The intermediate panel 30 is thus temporarily fixed to the case 10.

Figure 8:
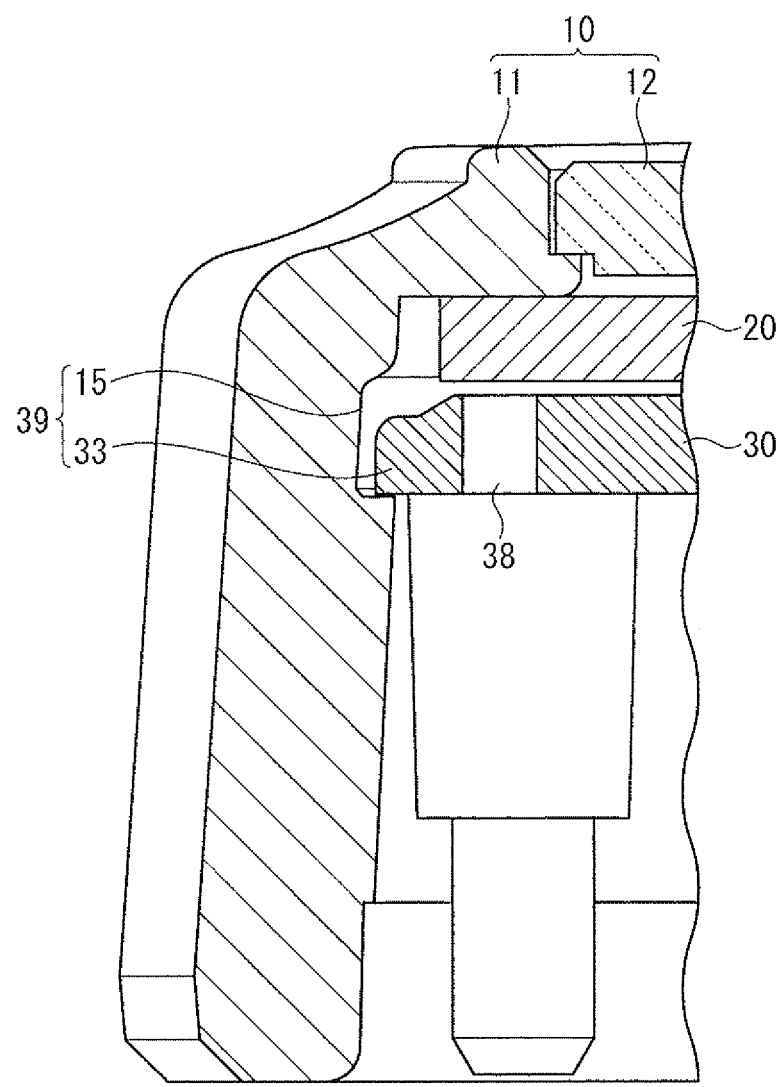
FIG. 8 is a cross sectional view showing an engaged state between the case and the intermediate panel according to the exemplary embodiment.
Figure 10:
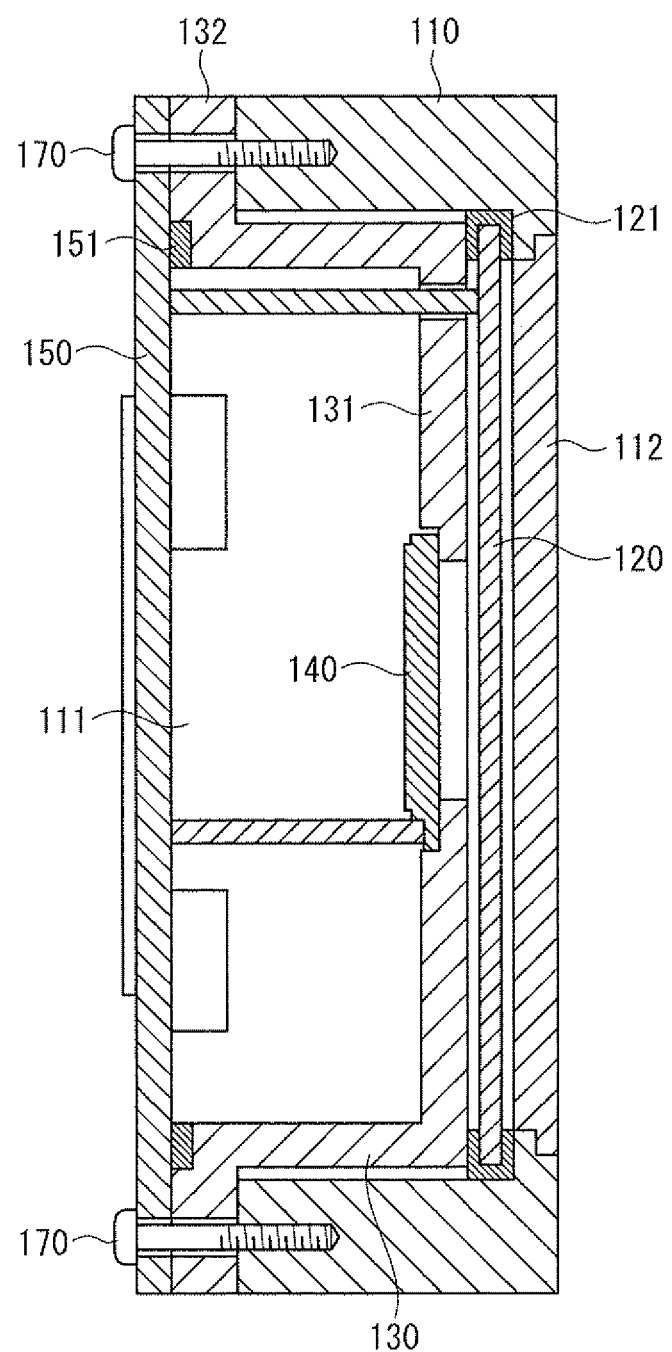
FIG. 10 is a cross sectional view showing a typical dust-proof structure for a measuring tool.

As shown in FIG. 8, the recess 15 (15A to 15C) formed on the inner circumferential surface of the case 10 and the projecting portion 33 (33A, 33B, 33C and 33D) of the intermediate panel 30 in combination serve as a temporary-fixing unit 39 that temporarily fixes the intermediate panel 30 to the case 10 while the outer circumferential portion of the solar panel 20 is pressed against the bottom wall of the case 10.

As shown in FIGS. 2 and 3, the display device 40, which is in an elongated rectangular shape, is disposed in the inward portion of the intermediate panel 30 to be opposed to the solar panel 20 with a gap 42. In the display device 40, a number display portion 41 and the like are formed. The number display portion 41 includes seven-segment display elements to show plural digits.

As shown in FIGS. 2, 3, 9A and 9B, the rubber switch member 50 is formed from an elastic material such as rubber into a disc-like shape, and is interposed between the display device 40 and the substrate 60. The rubber switch member 50 is provided with three screw-insertion holes 51A, 51B and 51C, three switch buttons 52A, 52B and 52C and two solar panel pressing projections 53A and 53B, which are integrally formed in the outer circumferential portion of the rubber switch member 50. Further, two display device pressing projections 54A and 54B are also integrally formed on the inward side relative to the screw-insertion holes 51A, 51B and 51C, the switch buttons 52A, 52B and 52C and the solar panel pressing projections 53A and 53B.

The three switch buttons 52A, 52B and 52C are disposed at positions where the switch buttons 52A, 52B and 52C are inserted in the button-insertion holes 13A, 13B and 13C of the case 10, respectively, when the rubber switch member 50 is accommodated in the case 10. The solar panel pressing projections 53A and 53B are disposed at positions corresponding to the clearance grooves 34A and 34B of the intermediate panel 30, so that the solar panel pressing projections 53A and 53B can press the rear side of the solar panel 20 via the clearance grooves 34A and 34B when the rubber switch member 50 is accommodated in the case 10. The display device pressing projections 54A and 54B are disposed at positions where the display device pressing projections 54A and 54B can press the rear side of the display device 40 when the rubber switch member 50 is accommodated in the case 10.

Consequently, when the solar panel 20, the intermediate panel 30, the display device 40, the rubber switch member 50 and the substrate 60 are accommodated in the case 10 and are fixed therein by the screws 70A, 70B, and 70C, the three switch buttons 52A, 52B and 52C are inserted in the button-insertion holes 13A, 13B and 13C, respectively. Simultaneously, the solar panel pressing projections 53A and 53B press the rear side of the solar panel 20 against the bottom wall of the case 10 via the clearance grooves 34A and 34B of the intermediate panel 30 while the display device pressing projections 54A and 54B press the rear side of the display device 40 toward the intermediate panel 30.

The substrate 60 is provided with a processing circuit or the like that processes an electric signal detected by the detector to calculate the displacement of the spindle and activates the display device 40 to show the calculation result. The substrate 60 is attached to the opening of the case 10 (i.e., the opening formed through the surface opposed to the protection plate 12) to close the opening of the case 10 as shown in FIGS. 2 and 3. Three screw-insertion holes 61A, 61B and 61C are formed in the outer circumferential portion of the base plate 60.

Advantages of Exemplary Embodiment (1) According to the above arrangement, in assembling the electric module unit 3, when the solar panel 20 is accommodated in the case 10 through the opening of the case 10 and then the intermediate panel 30 is accommodated in the case 10, the intermediate panel 30 is temporarily fixed by the temporary-fixing unit 39 while the outer circumferential portion of the solar panel 20 is pressed against the bottom wall of the case 10.

Next, the display device 40 is set in the inward portion of the intermediate panel 30. Even when dust or the like is removed by air blowing before setting the display device 40, the dust or the like can be prevented from entering the gap 23 between the solar panel 20 and the bottom wall of the case 10 (the protection plate 12), thereby preventing deterioration in appearance due to the dust or the like.

(2) Subsequently, after the display device 40 is set in the inward portion of the intermediate panel 30 and the rubber switch member 50 and the substrate 60 are accommodated through the opening of the case 10, the substrate 60, the rubber switch member 50, the display device 40, the intermediate panel 30 and the solar panel 20 are secured to the case 10 by the screws 70A, 70B and 70C to assemble the electric module unit 3.

When the electric module unit 3 is assembled, the solar panel pressing projections 53A and 53B press the rear side of the solar panel 20 against the bottom wall of the case 10 via the clearance gaps 34A and 34B of the intermediate panel 30 while the display device pressing projections 54A and 54B press the rear side of the display device 40 toward the intermediate panel 30, so that position shift of the solar panel 20 and the display device 40 can be prevented.

(3) The temporary-fixing unit 39 is provided by the recess 15 (15A to 15D) formed on the inner circumferential surface of the case 10 and the projecting portion 33 (33A to 33D) formed on the outer circumference of the intermediate panel 30. The projecting portion 33 (33A to 33D) are engageable with the recess 15 (15A to 15D). Thus, only by engaging the projecting portion 33 (33A to 33D) of the intermediate panel 30 with the recess 15 (15A to 15D) of the case 10, the intermediate panel 30 can be reliably temporarily fixed while the outer circumferential portion of the solar panel 20 is pressed against the bottom wall of the case 10.

(4) The holes 38A to 38D are formed inwardly adjacent to the projecting portions 33A to 33D, respectively, such that the elastic beams 37A to 37D remain between the holes 38A to 38D and the projecting portions 33A to 33D, respectively. When the intermediate panel 30 is eased along the inner circumferential wall of the case 10 for engaging the projecting portions 33A to 33D of the intermediate panel 30 with the recesses 15A to 15D of the case 10, respectively, the projecting portions 33A to 33D of the intermediate panel 30 are deformed inwardly due to the elastic deformation of the elastic beams 37A to 37D. When reaching the recesses 15A to 15D of the case 10, the projecting portions 33A to 33D are restored outwardly with elasticity to be engaged with the recesses 15A to 15D of the case 10, respectively. The projecting portions 33A to 33D can thus be easily engaged with the recesses 15A to 15D of the case.

(5) The window 31 is formed in the inward portion of the intermediate panel 30 so that the display device 40 is visible through the solar panel 20 and the protection plate 12. The first sealing portion 35 in contact with the solar panel 20 and the second sealing portion 36 in contact with the display device 40 are formed along the circumference of the window 31. With this arrangement, it is possible to prevent dust or the like from entering not only the gap 23 between the protection plate 12 and the solar panel 20 but also the gap between the solar panel 20 and the display device 40. Thus, deterioration in appearance due to the dust or the like can be further prevented.

Modifications

It should be appreciated that the scope of the invention is not limited to the above exemplary embodiment but modifications and improvements are included within the scope of the invention as long as an object of the invention is achieved.

For instance, although the gap 23 between the protection plate 12 of the case 10 and the solar panel 20 and the gap 42 between the solar panel 20 and the display device 40 are dust proof in the exemplary embodiment, the solar panel 20 and the display device 40 may be replaced by electronic components such as a circuit board.

In the exemplary embodiment, the temporary-fixing unit 39 is exemplarily provided by the four recesses 15A, 15B, 15C and 15D formed on the inner circumferential wall of the case 10 and the projecting portions 33A, 33B, 33C and 33D formed on the outer circumference of the intermediate panel 30. However, the number of the recesses or the projecting portions is not limited to four but may be, for instance, two or more. The temporary-fixing unit 39 may be provided by an arrangement different from the recesses and the projecting portions.

Although the tongue-like first sealing portion 35 and the second sealing portion 36 with a semicircular cross section are integrally formed on the circumference of the window 31 of the intermediate panel 30 in the exemplary embodiment, the first sealing portion 35 and the second sealing portion 36 may be separate members from the intermediate panel 30. In this instance, the first sealing portion 35 and the second sealing portion 36 may be made of an elastic material and be attachable to the intermediate panel 30 along the circumference of the window 31.

Although an elastic material such as rubber is used to form the rubber switch member 50 in the exemplary embodiment, the material is not limited to rubber. An elastic material different from rubber may be usable. Alternatively, an arrangement having resilience may be interposed between the display device 40 and the substrate 60.

Although the exemplary embodiment relates to the digital dial gauge, the invention is also applicable to any other tool. For instance, the invention is applicable to general measuring tools such as an electronic caliper, a micrometer and a scale unit.

What is claimed is:

1. A dust-proof structure for a measuring tool, comprising:
a case being provided with an opening formed through a surface opposed to a bottom wall thereof;
a first electronic component being accommodated in the case through the opening of the case;
an intermediate panel being configured to press an outer circumferential portion of the first electronic component against the bottom wall of the case;
a second electronic component being disposed at an inward portion of the intermediate panel and being opposed to the first electronic component with a gap;
a cover being attached to the opening of the case to close the opening of the case;
a securing unit being configured to secure the cover and the intermediate panel to the case; and
a temporary-fixing unit being disposed between the intermediate panel and the case, the temporary-fixing unit being configured to temporarily fix the intermediate panel to the case while the outer circumferential portion of the first electronic component is pressed against the bottom wall of the case, the temporary-fixing unit including a recess formed in an inner circumferential surface of the case, and a projecting portion formed on an outer circumference of the intermediate panel to be engageable with the recess.

2. The dust-proof structure according to claim 1, wherein a hole is formed through the intermediate panel on an inward side relative to the projecting portion such that an elastic beam remains between the projecting portion and the hole.

3. The dust-proof structure according to claim 1, wherein the first electronic component is a solar panel, the second electronic component is a display device, and the bottom wall of the case opposed to the solar panel is a transparent protection plate,
an elastic body is accommodated between the display device and the cover, and
the display device is visible through the protection plate of the case opposed to the solar panel.

4. The dust-proof structure according to claim 3, wherein a window is formed in the inward portion of the intermediate panel so that the display device is visible through the solar panel and the protection plate, and
a first sealing portion contacting with the solar panel and a second sealing portion contacting with the display device are formed along a circumference of the window.

* * * * *